United States Patent [19]

Bierwith

[11] 4,413,432
[45] Nov. 8, 1983

[54] WEDGE AND CLAMP LOCKING SYSTEM

[76] Inventor: Robert S. Bierwith, 145 Basinside Way, Alameda, Calif. 94501

[21] Appl. No.: 396,763

[22] Filed: Jul. 9, 1982

[51] Int. Cl.³ .............................................. E02F 9/28
[52] U.S. Cl. .................................. 37/142 A; 403/317; 403/318; 403/379
[58] Field of Search ............. 37/142 A, 142 R, 141 T; 299/92; 403/316, 317, 318, 379, 409

[56] References Cited

U.S. PATENT DOCUMENTS

| 2,987,838 | 6/1961 | Stratton | 37/142 A |
| 3,572,785 | 3/1971 | Larson | 37/142 A X |
| 3,722,932 | 3/1973 | Dougall | 37/142 A X |
| 4,267,653 | 5/1981 | Hahn et al. | 37/142 A |

Primary Examiner—Clifford D. Crowder
Attorney, Agent, or Firm—Bruce & McCoy

[57] ABSTRACT

An improved wedge and clamp locking system having an unidirectional interlock which can be disassembled to unlock the system rather than reversing the locking procedure by driving out the wedge.

5 Claims, 4 Drawing Figures

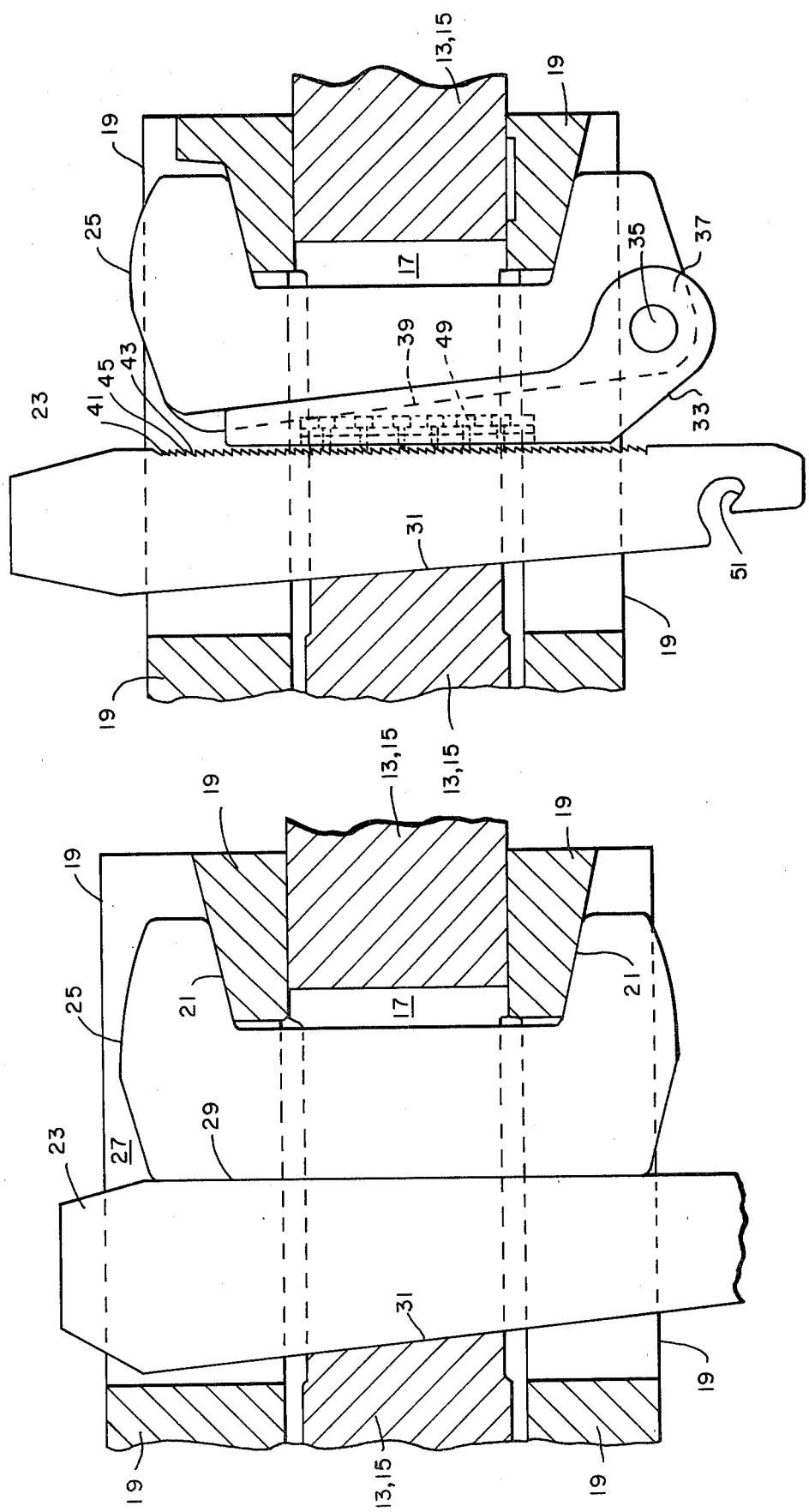

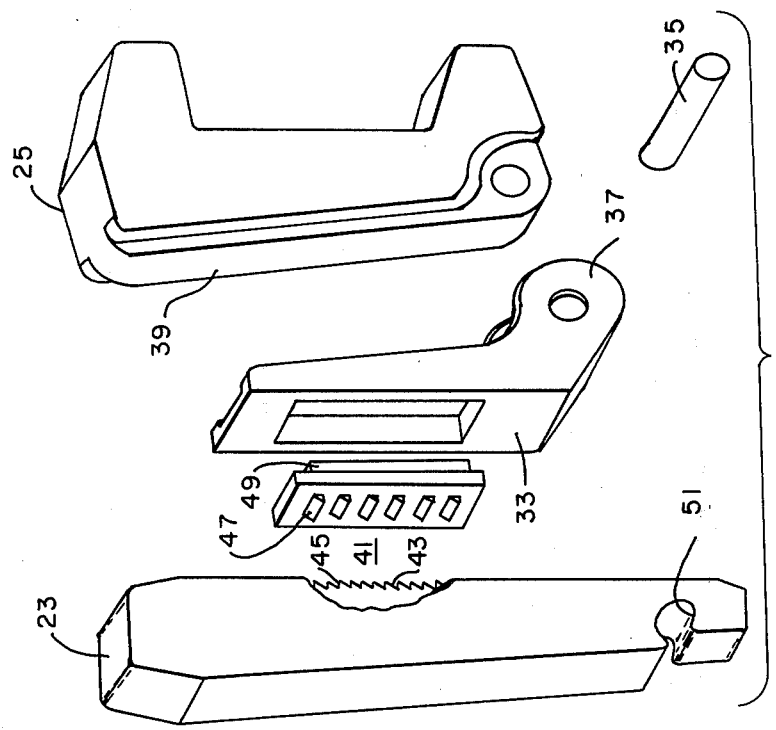
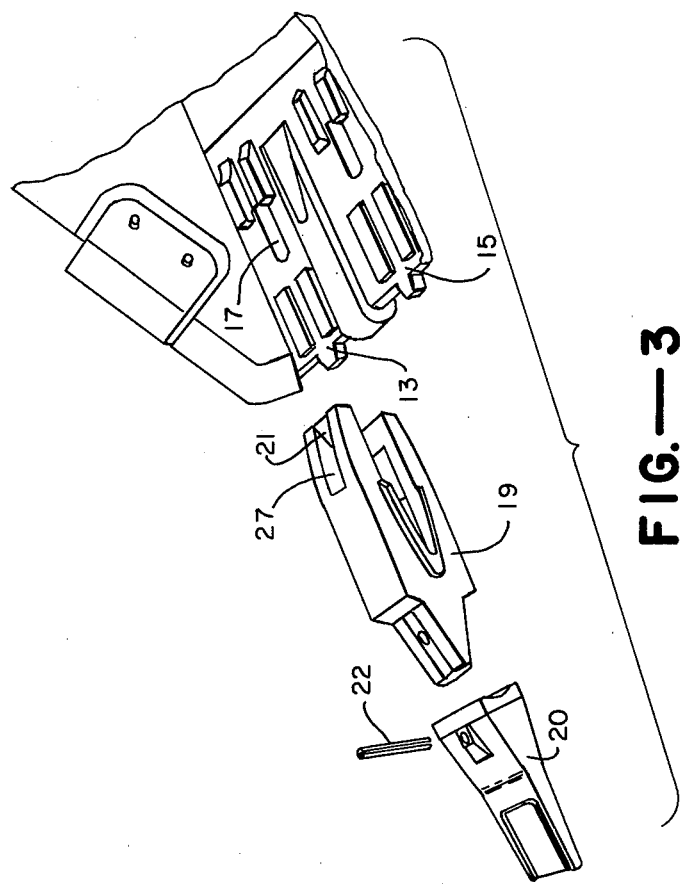

WEDGE AND CLAMP LOCKING SYSTEM

BACKGROUND OF THE INVENTION

1. Field of the Invention

The present invention relates to wedge and clamp locking systems. More particularly it relates to an improved wedge and clamp locking system for an excavator bucket tooth which employs a Whistler base for supporting the tooth on the mining lip of the excavator bucket along with a C-clamp for securing the Whistler base to the bucket lip. The clamp is held in place by a wedge driven between a portion of the bucket lip and the clamp.

2. Description of the Prior Art

The prior art relating to the present invention is shown in FIGS. 1 and 3 of the drawings. Thereshown is a portion of a mounting projection 13 for a digging tooth disposed on the mining lip 15 of a typical excavator bucket. A female locator receptacle 17 is disposed in the mounting projection 13. The receptacle is an opening for receiving a wedge and clamp. A Whistler base 19 is arranged on the mounting projection and a pair of seating surfaces 21 are disposed at the front end of an opening in the Whistler base which colocates with the locator receptacle in the mining lip. The seating surfaces align with the front end of the female locator receptacle, the front end being toward the lip of the mining bucket.

An excavator digging tooth 20 is secured to the Whistler base 19 with a pin 22 and the Whistler base is secured to the mining lip by means of a wedge 23 and clamp 25. The clamp 25 is inserted through the female locator receptacle 17 in the mining lip and the opening 27 in the Whistler base and wedged onto the seating surfaces 21 formed on the Whistler base. The seating surfaces lock onto the mounting projection 13 of the mining lip 15 due to the compression by the clamp of the seating surfaces 21 of the Whistler base onto the lip. A wedge 23 is driven between the back portion 29 of the clamp, which locks the Whistler base to the mining lip, and a portion of the mining lip 13 inside the female locator receptacle 17 to lock the Whistler base onto the mining lip.

The problem with the prior art is that during a working day of digging with the mining bucket, the wedges holding the digging teeth on the mining lip work loose and the operator of the excavator or an assistant must climb down and hammer the wedges 23 back into place to retighten the clamps 25.

In an effort to overcome the problem of the Whistler bases loosening up during digging, some attempts have been made to provide an interlock between the wedge and the C-clamp. However, in each of these cases the interlock is permanent and must be burned away by torches to disengage the wedge from the clamp. This is a time consuming and expensive solution which has seen considerable use, but it has proved very unsatisfactory.

There has therefore been a need in the industry to provide a dependable secure locking system for holding the Whistler base on the mining lip of excavator buckets: one which will not loosen up and yet can be easily unlocked. It will be seen from the disclosure of the present invention that the desired improvement and solution to the described problem has been achieved by the present invention.

SUMMARY OF THE INVENTION

The present invention is an improved wedge and clamp locking system for use where the interaction of the wedge and clamp to effect the locking action is to expand the physical occupation of a confined space as the wedge is forced into the space occupied by the clamp and against the clamp. The improvement comprises a detachable bearing surface disposed on said clamp and a locking surface disposed on the wedge for engaging the detachable bearing surface of the clamp. An interlock is provided between the detachable bearing surface of the clamp and the locking surface of the wedge. The interlock permits only unidirectional movement of the wedge into the space occupied by the wedge and clamp so as to tighten the locking system as the wedge is forced into the space. The locking system is unlockable by detaching the bearing surface from the clamp and removing the wedge and the detachable bearing surface from the confined space as a unit until the two parts are clear of the confined space and can be separated and disengaged.

OBJECTS OF THE PRESENT INVENTION

It is therefore an object of the present invention to provide an improved wedge and clamp locking system which will not work loose once the wedge and clamp have been tightened.

It is another object of the present invention to provide a wedge and clamp locking system which provides positive locking and yet can be quickly and easily unlocked.

It is a further object of the present invention to provide a wedge and clamp locking system which can be disassembled in a manner which permits the interlocked portion of the locking system to be removed from the location at which the locking system is employed in an interlocked relationship to a location where the interlocked portion can be easily separated and disengaged.

And it is still another object of the present invention to provide an improved wedge and clamp locking system which is reusable and substitutes for the standard wedge and clamp locking system utilized with Whistler bases presently in use.

Other objects of the invention will become apparent when the accompanying disclosure of the preferred embodiment of the invention is considered in conjunction with the accompanying drawings.

DESCRIPTION OF THE DRAWINGS

FIG. 1 is a side elevation and partial section showing the wedge and clamp locking system of the prior art;

FIG. 2 is a side elevation showing the wedge and clamp locking system of the present invention;

FIG. 3 is a bottom plan view of the invention shown in FIG. 2; and

FIG. 4 is an exploded perspective view of the embodiment shown in FIG. 2.

DESCRIPTION OF THE PREFERRED EMBODIMENT

The present invention shown in FIGS. 2, 3 & 4 is an improved wedge and clamp locking system for use in situations where there is an interaction between the wedge and clamp to effect the locking action is expanding the physical occupation of a confined space as the wedge is forced against the clamp into the space occupied by the clamp. More particularly, it is an improved wedge and clamp locking system for use with an excavator bucket digging tooth employing a Whistler base for supporting the tooth on the mining lip of the bucket. In the prior the clamp 25 is used for securing the Whistler Base 19 to the bucket lip 15, and the wedge 23 which holds the clamp in place is disposed between an internal surface 31 of the bucket lip and the clamp.

The improvement of the present invention comprises a detachable bearing surface 33 disposed on the clamp 25 which interlocks with the wedge. This detachable bearing surface is that portion of the clamp against which the wedge 23 slides as it is forced into the space occupied by the clamp. The detachable bearing surface is secured to the clamp by a removable pin 35 whereby the interlocked wedge and detachable bearing surface can be driven out of the female locator opening 13 formed in the mining lip of the excavator bucket in an interlocked relationship to release the Whistler base. When the wedge and detachable bearing surface are clear of the opening they can be separated and disengaged.

The detachable bearing surface 33 serves as the back of the clamp 25 which bears against the wedge 23 and is formed with a bracket having a pair of flanges 37 disposed on opposite sides of the clamp. The flanges are preferably located at the end of the detachable bearing surface. The removable pin 35 projects through both of said flanges on the bearing surface and through the clamp. The arrangement of dual flanges equalizes the load on the clamp caused by the action of the wedge.

The surface 39 on the back of the clamp 25 which engages the bearing surface 33 is sloped away from the surface of the wedge 23 which contacts the bearing surface whereby when the pin 35 is removed, the wedge and the detachable bearing surface slide along the sloped surface 39 of the clamp to release the wedging action of the wedge on the clamp. In the preferred embodiment, the rear engaging surface 39 of the clamp is sloped in the direction towards the end of the clamp through which the pin passes so that as the bearing surface is slid along the engaging surface of the clamp, toward the pin end of the clamp, the bearing surface 33 tends to retract away from the wedge 23 to aid in unlocking the system when the Whistler Base is to be removed from the mining lip of the excavator.

A locking surface 41 is formed on the wedge 23 and disposed on the side of the wedge which engages the detachable bearing surface 33 of the clamp 25. In the preferred embodiment, the wedge is provided with a ratchet surface made of a series of inclined ramps 43 and perpendicular locking faces 45.

The detachable bearing surface 33 is provided with at least one depressable ratchet surface engaging key 47 but in the preferred embodiment a multiple of keys are utilized. The keys have mating surfaces which engage the perpendicular locking faces of the ratchet surface on the wedge 23. In the preferred embodiment, the depressable ratchet engaging keys 47 are paired and a series of them are located in the bearing surface for finer adjustment of the wedge location. One key of each pair of depressable keys engages the ratchet surface 41 of the wedge 23 at one half the distance between the perpendicular locking faces on the ratchet surface on the wedge so that for each movement of the wedge equal to one half the distance between the ratchet locking surfaces, the direction of movement being into wedging relation causes either one or the other of the keys in each pair to interlock with one of the perpendicular faces to prevent retraction of the wedge. This permits only unilateral movement of the wedge into the space between the bearing surface and that portion of the mining lip between which it is wedged. Several sets or series of these keys are used for strength and stability. These keys are backed by depressable rubber pads 49 which allows them to project outward from the detachable bearing surface except when they are forced inward by the action of the wedge ratchet inclined ramps 43 of the wedge forcing the keys 47 up the ramps 43 until they index into a locking relationship with the perpendicular locking faces 45 of the ratchet surface at which point they pop outward to engage the ratchet surface.

This interlocking of the ratchet engaging keys 47 with the ratchet 41 surface on the wedge 23 prevents the wedge from being withdrawn from its engagement with the clamp 25 and from moving away from the unilateral direction of tighter wedging movement into engagement with the clamp permitted by the keys. This unilateral movement of the wedge with respect to the clamp forces the clamp onto the Whistler base as the wedge is driven between the mining lip and the clamp.

The improved locking system of the preferred embodiment is unlockable by removing the pin 35 which secures the detachable bearing surface 33 to the clamp 25 and sliding the interlocked wedge 23 and detachable bearing surface 33 down the sloped engaging surface 39 on the back of the clamp to release the wedging action of the wedge. The interlocked parts, the wedge and the detachable bearing surface, are moved as a unit until the bearing surface and the wedge have been removed from the space or opening in the mining lip; they can then be separated and the interlock of the parts disengaged.

The purpose of the present invention is to overcome the problem of the prior art locking wedges working loose. Not only does the present invention solve that problem, but in fact is has the advantage of the reverse effect. The locking wedges of the present invention are self tightening during use. It has been found that in most instances when the wedges are removed after use they actually locked tighter than they were when they were installed. This advantage of self tightening is more than a solution to the problem of the prior art: it is a distinct advantage.

In the preferred embodiment of the present invention, an additional advantage can be obtained if a hook 51 is formed at the narrow end of the wedge 23 to permit a hydraulic force to be engaged with the wedge. After the retaining pin 35 has been removed from the detachable bearing surface 33 and clamp 25, the locking system can be pulled apart hydraulically rather than pounded apart as must be done with the prior art. This is considerably safer and easier than the older method in which the wedge had to be pounded with a sledge hammer to break the locked relationship with the clamp.

The present invention thus provides a wedge and clamp locking system which allows for a secure lock between the clamp and the wedge and eliminates the need for frequent retightening of the clamps, yet allows for simple disengagement of the locking units from the whistler base and easy release of the interlock between the wedge and the detachable portion of the clamp at the convenience of the operator.

Thus it can be seen that the objects and advantages attributed to the present invention can be achieved, and while the invention has been described in considerable detail, it is not to be limited to such details as have been set forth except as may be necessitated by the appended claims.

I claim:

1. An improved wedge and clamp locking system wherein the interaction between the wedge and clamp to effect the locking action is to expand the physical occupation of a confined space as the wedge is forced against the clamp into the space occupied by the clamp, the improvement comprising
   a detachable bearing surface disposed on said clamp, the bearing surface being that portion of the clamp against which the wedge slides as it is forced into the space occupied by the clamp,
   a locking surface disposed on said wedge for engaging said detachable bearing surface on said clamp, and
   an interlock disposed on the detachable bearing surface of said clamp for engaging the locking surface of said wedge, said interlock permitting only unidirectional movement of said wedge into the space occupied by the wedge and clamp so as to tighten the locking system as the wedge is forced into the space, said interlock being unlockable by detaching said bearing surface from said clamp and removing said wedge and said bearing surface from said confined space as a unit in the interlocked relationship until the wedge and the detachable bearing surface are clear of the confined space and can be separated and disengaged.

2. The improved locking system of claim 1 wherein the detachable bearing surface is secured to the clamp by a removable pin whereby when the pin is removed the wedge and the detachable bearing can be moved out of the confined space as a unit.

3. The improved locking system of claim 2 wherein the detachable bearing surface is formed with a pair of flanges which bracket opposite sides of the clamp and said removable pin projects through both of said flanges and said clamp to equalize the load on said clamp caused by the action of said wedge, and wherein said clamp has a sloped surface engaging said bearing surface which is sloped away from said locking surface of said wedge whereby when said pin is removed, and said wedge and said bearing surface are moved as an interlocked unit to unlock the system, the bearing surface slides along the sloped surface of the clamp to release the wedging action of the wedge on the clamp and to permit the bearing surface to more easily slide clear of the clamp until the surfaces can be disengaged and unlocked.

4. The improved locking system of claim 1 wherein the wedge is provided with a ratchet surface and the detachable bearing surface is provided with at least one depressable ratchet engaging key which depresses into said bearing surface as said wedge is moved in the direction of unilateral movement and into wedging relation with said clamp, said ratchet engaging key interlocking with said ratchet surface to prevent said wedge from being withdrawn from engagement with the clamp or moving opposite to the direction of unilateral movement.

5. An improved wedge and clamp locking system for an excavator bucket tooth employing a Whistler Base for supporting the tooth on the mining lip of the excavator bucket and a clamp to secure the Whistler Base to the bucket lip, said clamp being held in place by a wedge disposed between a portion of the bucket lip and said clamp, the improvement comprising,
   a detachable bearing surface formed to serve as that portion of the clamp which bears against the wedge, said bearing surface having a pair of flanges extending from one end thereof and disposed on opposite sides of one end of the clamp, said bearing surface being secured to said clamp by a removable pin which extends through the flanges of said bearing surface and the end of the clamp disposed therebetween, the surface on the clamp which engages said bearing surface being sloped in the direction toward the end of said clamp through which the pin passes so that as said bearing surface is slid along the clamp towards the pin end thereof the bearing surface and the wedge interlocked therewith retract away from the portion of the mining lip that the wedge bears against thereby releasing the wedging action and unlocking the system when the Whistler Base is to be removed from the mining lip of the excavator bucket,
   a ratchet surface disposed on said wedge for engaging the bearing surface on said clamp, and
   at least one depressible ratchet engaging key disposed in said bearing surface for interlocking with said ratchet surface on said wedge and permitting only unidirectional movement of said wedge with respect to said clamp in a direction to force said clamp onto the Whistler Base as said wedge is driven between the portion of the mining lip of the excavator bucket and the clamp, said key preventing said wedge from being withdrawn from engagement with the bearing surface of said clamp, said locking system being unlockable by removing said pin securing said detachable bearing surface to said clamp and sliding the interlocked wedge and bearing surface down the sloped engaging surface on said clamp to unlock the system and until the wedge and bearing surface are clear of the bucket lip and the Whistler base and the wedge can be separated from the bearing surface and the interlock disengaged.

* * * * *